No. 895,525. PATENTED AUG. 11, 1908.
R. H. WHITE.
BRAKE MECHANISM.
APPLICATION FILED MAY 10, 1906.

2 SHEETS—SHEET 2.

Witnesses.
E. B. Gilchrist
H. B. Sullivan

Inventor:
Rollin H. White
By Thurston Woodward.
attorneys

UNITED STATES PATENT OFFICE.

ROLLIN H. WHITE, OF CLEVELAND, OHIO, ASSIGNOR, BY MESNE ASSIGNMENTS, TO THE WHITE COMPANY, OF CLEVELAND, OHIO, A CORPORATION OF OHIO.

BRAKE MECHANISM.

No. 895,525.  Specification of Letters Patent.  Patented Aug. 11, 1908.

Application filed May 10, 1906. Serial No. 316,074.

*To all whom it may concern:*

Be it known that I, ROLLIN H. WHITE, a citizen of the United States, residing at Cleveland, in the county of Cuyahoga and State of Ohio, have invented a certain new and useful Improvement in Brake Mechanism, of which the following is a full, clear, and exact description.

The object of this invention is to provide an efficient inside hub brake, especially adapted for automobiles, which shall be so constructed as to prevent dirt and other foreign materials from getting into the hub drum and being obliged to work its way out between the braking surfaces.

The invention consists in the combinations of parts hereinafter described and pointed out definitely in the claims.

Figure 1:
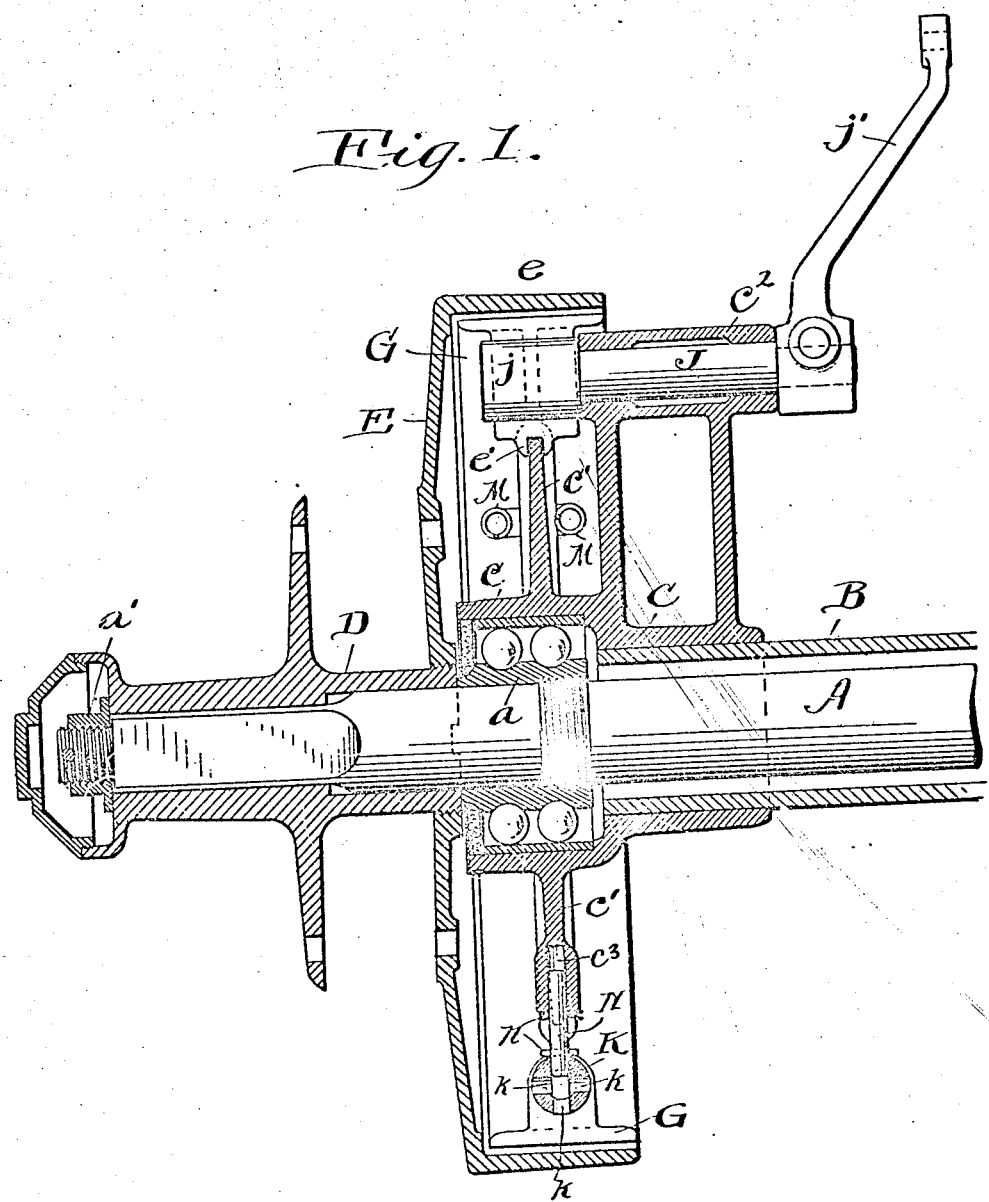
Figure 2:
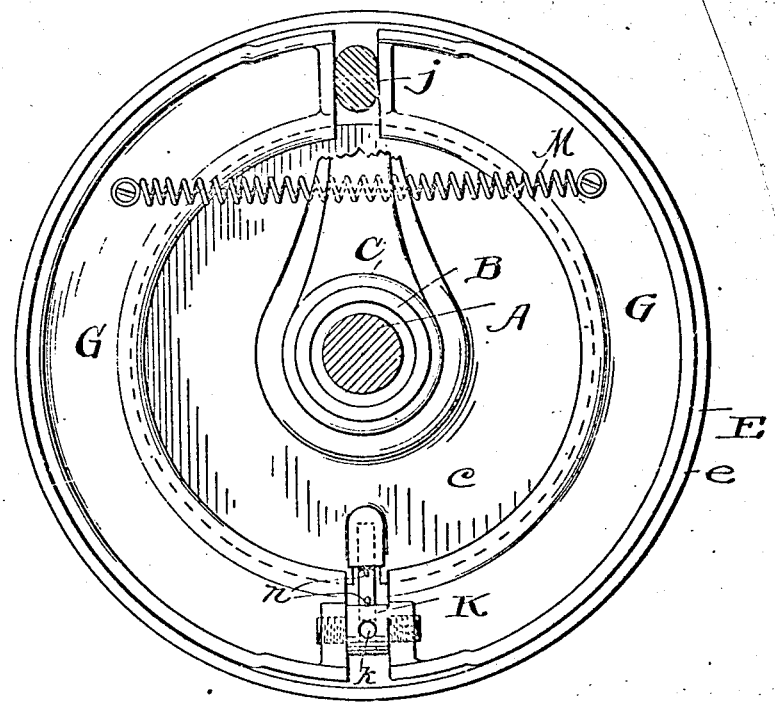
Figure 3:
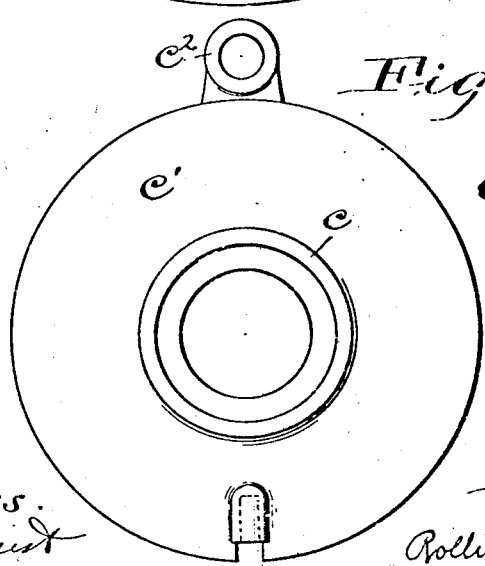

In the drawing, Figure 1 is a central longitudinal sectional view of the invention. Fig. 2 is a view from the right side of Fig. 1; and Fig. 3 is an end view of the sleeve C, from the left side of Fig. 1.

A represents one of the driving axles of a motor car.

B represents one of the casing tubes through which the axle passes and in which it is rotatively mounted. The axle bearing is in the overhanging end of a sleeve C which is immovably fastened upon the tube B.

D represents the wheel hub which is non-rotatively secured upon the projecting end of the axle. A disk E is screwed upon and immovably secured to the wheel hub, and is provided with an overhanging cylindrical flange $e$, whose interior surface is the braking surface. This disk and its flange constitute what is commonly called the brake drum. On the overhanging part $c$ of the sleeve C, within the flange $e$, is a circumferential disk-like flange $c'$. The two brake shoes G G are substantially semi-circular in form, and each is provided with an inwardly extended grooved flange $e'$, the groove of which embraces the outer edge of the disk $c'$. These two semi-circular brake shoes are adjustably connected together by a right and left hand screw K, which fits with sufficient looseness in the holes in the ends of the brake shoes to permit them to swing relatively to each other, as on a pivot, enough to bring their outer peripheries into contact with flange $e$, or to permit them to draw inward and embrace the disk $c'$. The central body of the double screw has radial holes $k$, into which a pin N may be inserted to turn the screw. This pin ordinarily lies partly in one of said holes and in a radial hole $c^3$ in disk $c'$, being held in place by two cotter pins $n$, and thereby the screw K is prevented from turning after it has been properly adjusted. A spring or springs M secured to the two brake shoes exerts its force to draw them together, and, in so doing, to draw them in upon the cylindrical flange $c'$ and thereby to draw them away from the inner surface of the flange $e$.

A rock shaft J mounted in bearings $c^2$, which are a part of the sleeve C, has on one end a cam $j$, which lies between the disconnected ends of the brake shoes. This shaft is provided with an operating arm $j'$, whereby the shaft may be turned with the result of so moving said cam that the brake shoes are thrust apart or expanded into contact with the inner surface of the flange $e'$.

This construction has two distinct advantages. In the first place, when the cam $j$ is in the position shown in Fig. 2, the spring M, acting upon the brake shoes G, draws them toward each other, and thereby causes them to closely embrace the flange $c'$, and this insures that they shall not drag at any point upon the flange $e$. The main advantage, however, is that the brake drum is closed, so to say. That is to say, the two brake shoes and the flange $c'$ prevent stones or dirt or other foreign particles from getting into the brake drum behind the brake shoes. When, in ordinary inside hub or drum brakes, the dirt does get to this place, it usually has to work its way out between the inner periphery of the brake drum and the outer opposed surface of the brake shoes. This, of course, lessens the efficiency of the brake and it also causes these braking surfaces to be worn or ground away by the dirt which gets between them.

Having described my invention, I claim:

1. In an automobile, the combination with the rotatable wheel, a brake drum fixed thereto, and a non-rotating disk within said drum in a plane at right angles to its axis with arc shaped brake shoes located within said drum and provided with internal circumferential grooves which embrace the edge of said disk, means for thrusting said shoes apart and into contact with the drum, and a spring for drawing said shoes together upon said flange.

2. In an automobile, the combination with a rotatable wheel, a brake drum fixed thereto, and a non-rotatable disk within said drum, with arc-shaped brake shoes located within said drum and provided with internal circumferential grooves which embrace the outer edge of said disk, means adjustably connecting an end of one shoe with the adjacent end of the other shoe, a cam interposed between the other adjacent ends of said two brake shoes, mechanism for operating said cam, and a spring for drawing said shoes together upon said disk.

3. An automobile brake consisting of a sleeve fast upon one of the tubular casing members and overhanging the same and having a radial flange upon its overhanging portion, with an axle projecting through and having its bearing in said sleeve, a wheel hub non-rotatably secured to said axle, a brake drum fixed to said wheel hub with its flange overhanging said sleeve and the radial flange thereon, two approximately semi-cylindrical brake shoes each having an internal groove which fits over the edge of said flange, means adjustably connecting said brake shoes together at one end thereof, a spring connected with said brake shoes and tending to contract them upon said flange, a rock shaft mounted in bearings which are rigid with said sleeve, and mechanism operated by said rock shaft to expand said brake shoes.

In testimony whereof, I hereunto affix my signature in the presence of two witnesses.

ROLLIN H. WHITE.

Witnesses:
E. L. THURSTON,
E. B. GILCHRIST.